MULTIPLEX ELECTRIC COMMUNICATION SYSTEM

Filed June 21, 1947 4 Sheets-Sheet 1

Inventor.
Prafulla Kumar Chatterjea
Alec Harley Reeves
By Robert Harding Jr.
Attorney April 3, 1956 P. K. CHATTERJEA ET AL 2,740,839

MULTIPLEX ELECTRIC COMMUNICATION SYSTEM

Filed June 21, 1947 4 Sheets-Sheet 2

Inventor.
Prafulla Kumar Chatterjea
Alec Harley Reeves
By Robert Harding Jr.
Attorney

MULTIPLEX ELECTRIC COMMUNICATION SYSTEM

Filed June 21, 1947 4 Sheets-Sheet 3

Inventor
Prafulla Kumar Chatterjea
Alec Harley Reeves
By Robert Harding Jr.
Attorney

MULTIPLEX ELECTRIC COMMUNICATION SYSTEM

Filed June 21, 1947 4 Sheets-Sheet 4

Inventor
Prafulla Kumar Chatterjea
Alec Harley Reeves
By Robert Harding
Attorney

United States Patent Office 2,740,839

Patented Apr. 3, 1956

2,740,839

MULTIPLEX ELECTRIC COMMUNICATION SYSTEM

Prafulla Kumar Chatterjea and Alec Harley Reeves, London, England, assignors to International Standard Electric Corporation, New York, N. Y.

Application June 21, 1947, Serial No. 756,262
In Great Britain April 16, 1946

Section 1, Public Law 690, August 8, 1946
Patent expires April 16, 1966

2 Claims. (Cl. 179—15)

The present invention relates to electric pulse communication systems of the kind which employ time displacement of the pulses for conveying the intelligence. The invention concerns more particularly multi-channel systems, but as will be made clear later, similar principles may be employed when there is only one channel.

In the case of multi-channel pulse systems it is now common practice to generate a train of regularly repeated pulses for each channel, the various channel trains being interleaved so that adjacent pulses belong to different channels. The pulses of each channel may be time-phase modulated, that is, any given pulse will occur later or earlier than its normal time of occurrence when unmodulated, by an amount proportional to the corresponding value of the modulating signal voltage. According to a variation of this system now tending to become obsolete, the channel pulses occur in pairs which are displaced in opposite directions by the modulating signal.

On account of the fact that in practice such pulses have always to be transmitted over a communication medium which will pass a limited band of frequencies, the transmitted pulses can never have the ideal rectangular form, and it follows that each pulse is affected by the preceding pulses because the trailing edge of a pulse has never quite disappeared before the leading edge of a following pulse begins to appear. Since the time spacing between any two pulses of different channels depends on the time displacement which such pulses happen to have in accordance with the corresponding modulating signals, it follows that the effective timing of the later pulse is affected by the timing of the earlier pulse, and the result is cross talk between all the channels of the system. It is evident, of course, that the effect will be greatest for adjacent channels, and the minimum crosstalk requirement for the system will accordingly limit the permissible maximum amplitude of the time displacement of the pulses, or alternatively, the minimum time spacing between adjacent pulses, and this limitation will be the greater the narrower the frequency band passed by the communication medium.

In order to give a practical example of the limitation which is set by this effect, it will be assumed that the level of the crosstalk in any channel derived from an adjacent channel should be at least 60 decibels below the normal signal level in the channel. This, in effect, means that the amplitude of the trailing edge of any pulse should have decreased from the maximum amplitude by at least 60 decibels before the next following pulse appears. In a typical transmission system a pulse may build up to the maximum in about ½ microsecond and may then fall away exponentially to 60 decibels below its peak in 2 microseconds. This means that if the amplitude of the modulation time displacement is ±½ microsecond, the mean positions of adjacent pulses must not be closer than about 3½ microseconds.

The principal object of the present invention is to obtain a closer spacing of the adjacent channel pulses without increasing the crosstalk beyond the limits which are at present regarded as permissible. This object is achieved according to the invention by employing a train of pulses to convey the intelligence in which the pulses are so timed that the time interval between any given signal-bearing pulse and the preceding pulse of the train depends only on the instantaneous signal magnitude represented by the given signal-bearing pulse.

The closer spacing is thus obtained, other things being equal, by modulating the timing of each pulse, not with respect to the mean time position determined by the unmodulated pulse train, but with respect to the timing of the preceding pulse. In other words, the characteristic which represents the modulating signal is the time interval between the pulse under consideration, and the preceding pulse. Thus if a pulse of channel $m$ is displaced by a corresponding modulating signal, the immediately following pulse belonging to channel $m+1$ is displaced by the same amount and the time spacing between the two pulses remains constant unless the pulse $m+1$ is modulated by a corresponding signal. In other words, though the presence of pulse $m$ may distort the form of pulse $m+1$ this distortion is constant as regards the signal time variation of the pulse $m$, so that no crosstalk is possible between channels $m$ and $m+1$.

While the invention is of particular advantage in its application to multi-channel pulse communication systems, it can also be applied when there is only one channel. In this case, the signal magnitude corresponding to any pulse is still represented only by the time spacing between that pulse and the preceding pulse, the only difference being that the preceding pulse belongs to the same train of channel pulses instead of to a different train of pulses.

The invention will be described with reference to the accompanying drawings in which.

Figure 1:
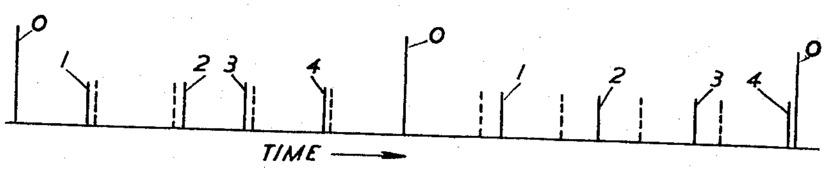
Figs. 1 and 2 show diagrams of pulse trains employed in the explanation of the principles of the invention.

According to the invention, as shown in Fig. 1, the signalling time is divided into a number of equal signalling periods by a train of regularly repeated pulses 0 having some characteristic by which they may be distinguished from the channel pulses, such, for example, as a larger amplitude, as indicated in Fig. 1. Such pulses will be called "coded pulses" for convenience, and they do not carry any signal. Three successive coded pulses 0 are shown in Fig. 1. The channel pulses are initially generated as trains of pulses having a repetition frequency the same as that of the coded pulses and are interleaved so that in each of the above-mentioned signalling periods each pulse belongs to a different channel. Four channel pulses designated 1, 2, 3 and 4 are shown in each of the two signalling periods which are shown in Fig. 1. The time positions of the channel pulses are varied by the corresponding modulating signals so that the time spacing between the pulse 1 of channel 1 and the preceding coded pulse 0 depends only on the instantaneous voltage of the signal carried by channel 1, and so that in the case of channel pulse 2, the time spacing between that pulse 2 and the preceding pulse 1 depends only on the instantaneous voltage of the signal carried by channel 2, and so on.

In Fig. 1, the unmodulated positions of the channel pulses are shown by the dotted lines, and these positions should preferably be equally spaced between two successive coded pulses. The channel pulses 1, 2, 3, 4 are shown variously displaced in the first signalling period in accordance with the corresponding signal voltages.

It will be evident that the actual displacement in time of the $m+1$th pulse in any signalling period with respect to the preceding coded pulse will be equal to the algebraic sum of the signal displacements of all the channel pulses in the period up to and including the $m+1$th pulse. Therefore it is necessary to space the pulses of the various channels in the signalling period so that if signal maxima in the same direction should occur simultaneously on all channels, the last pulse will not interfere with the next following coded pulse. In this way noises due to variations in the signalling period will be avoided.

In the second signalling period shown in Fig. 1 the four channel pulses are shown with the maximum signal displacement, which is of such sign as to increase the time spacing between adjacent pulses. The initial spacing of the channel pulses and the maximum allowable signal displacement should be so chosen that in these circumstances, the last channel pulse 4 should occur slightly before the coded pulse 0 which marks the commencement of the next signalling period. Thus if there are $n$ channel pulses, T is the signalling period between two coded pulses, $d$ is the duration of a pulse (assumed to be the same for the channel pulses and for the coded pulses), and $t$ is the maximum allowable increase in the spacing between adjacent pulses which can be produced by the signal modulation, then $[nT/(n+1)+t]+d$ should be slightly less than T, assuming that the channel pulses are equally spaced in the signalling period when unmodulated.

The margin or minimum time spacing between the last channel pulse and the next following coded pulse which should be allowed in these circumstances depends on the sharpness of the pulses after transmission over the communication medium, and therefore ultimately on the width of the frequency band transmitted. This margin should be about the same as the margin allowed for the closest spacing between any two adjacent channel pulses.

It will be appreciated that when a given channel pulse is displaced by the signal in the manner described according to the invention, a variable distortion of the pulse form will result from the presence of the preceding channel pulse. This will produce a corresponding distortion of the reproduced signal, but as already explained, there is no crosstalk from any of the preceding channel pulses. It has been found that a relatively much greater distortion of the pulse form may be allowed when no crosstalk is involved, and in the case of the example quoted above, the allowable figure for the decay of the trailing edge of the pulses is about 15 decibels instead of 60. With the same type of transmission circuit as before, the pulse amplitude would decay to 15 decibels below the maximum in about ½ microsecond, and this means that the mean pulse spacing can be 2 microseconds instead of 3½. This will enable about 75% more channels to be accommodated in the same signalling period.

It may be noted that if the coded pulses were omitted, the time modulation of the first channel pulse could be related to its spacing from the immediately preceding pulse of the last channel; but as it has already been explained that the last pulse is displaced by an amount which is the algebraic sum of the signal displacements of all the channel pulses, it will be clear that this process would result in crosstalk from every channel into every other channel. Another way of looking at the question is to note that this process would result in a variation in the mean repetition frequency of the pulses of every channel, which variation is a function of the signal displacements of all the other channels. The introduction of the coded pulses which do not carry any signal, in the manner described, prevents any such undesirable effect. It is to be noted, however, that according to another feature of the invention, if there is only one channel in the system, the instantaneous modulating signal voltage corresponding to any pulse may be quite satisfactorily represented by the time interval between that pulse and the preceding pulse of the same channel train, no coded pulses being used. In this case, of course, the question of inter-channel crosstalk does not arise.

Figure 2:
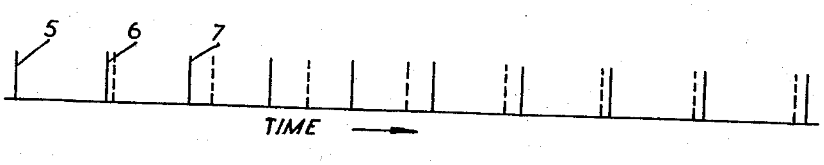

Fig. 2 illustrates the case in which there is only one channel, no coded pulses being employed. The pulse 5 is any pulse of the pulse train chosen as a reference pulse, and the dotted lines indicate what would be the time positions of the pulses when there is no modulating signal. These time positions are equally spaced. According to the invention, the instantaneous signal voltage at the time of the next pulse 6 is proportional to the time interval between the pulses 5 and 6, and the instantaneous signal voltage at the time of the following pulse 7 is proportional to the time interval between the pulses 6 and 7, and so on. Adjacent pulses are separated by time intervals which are greater or less than the constant unmodulated time interval, according to the signal voltage.

The time modulation process according to the present invention might be considered at first sight to have some resemblance to that employed in the known double pulse system referred to above, because the spacing between the pulses of each pair in this known system characterises the instantaneous modulating signal voltage. However, the two systems are really fundamentally different because it is to be noted that the spacing between adjacent pulses of different pairs in the double pulse system depends on both of the corresponding modulating signal voltages, and this would evidently produce crosstalk between adjacent channels in a multichannel system for the reasons already explained.

The time modulation process according to the invention may conveniently be referred to as "pulse period modulation."

Figure 3:
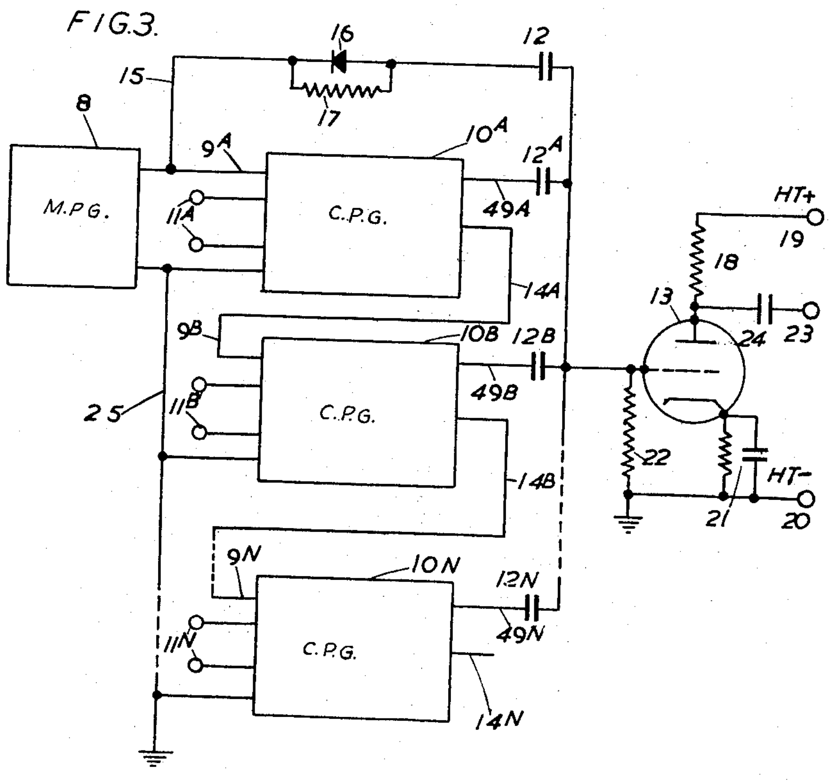
Figs. 3 and 4 show circuit diagrams of an arrangement for generating a multi-channel pulse train according to the invention.

Fig. 3 shows partly in block schematic form a circuit arrangement for generating a multi-channel pulse train of the kind described with reference to Fig. 1. A master pulse generator 8 produces the train of regularly repeated coded pulses 0. This generator may take any suitable known form which it is not necessary to describe in detail. The pulses are supplied over conductor 9A to the first of a tandem series of $n$ exactly similar channel pulse generators, of which only the first two and the last are shown, and are respectively designated 10A, 10B and 10N. The pulse generator 10A produces the short channel pulse 1 (Fig. 1) in response to a coded pulse 0 from the master pulse generator 8 at a time thereafter determined by the instantaneous signal voltage which is applied to terminals 11A. This channel pulse is supplied through a blocking condenser 12A to the control grid of a mixing valve 13. The channel pulse is also supplied over conductors 14A and 9B to the input of the second channel pulse generator 10B which then produces the second channel pulse 2 (Fig. 1) in response to channel pulse 1, at a time thereafter determined by the instantaneous voltage of the corresponding signal applied to terminals 11B. The channel pulse 2 is applied through the blocking condenser 12B to the control grid of the mixing valve 13 and also in like manner to the next channel pulse generator (not shown) over conductor 14B. Thus each channel pulse generator excites the next one in exactly the same way until the last generator 10N is reached. The last channel pulse is supplied through the condenser 12N to the mixing valve 13, but the corresponding output conductor 14N is left unconnected. When the last channel pulse has been generated, all the channel pulse generators are in the normal condition and nothing further happens until the next coded pulse arrives from the master pulse generator 8 to excite the first channel pulse generator 10A again, and the same series of operations is repeated, except that the actual timing of the channel pulses will in general have changed in accordance with the variations in the corresponding signal voltages.

The coded pulses are also applied to the mixing valve 13 over conductor 15 through a rectifier 16 shunted by a resistance 17 and through a blocking condenser 12. The purpose of the rectifier and resistance will be explained later on.

The mixing valve 13 is arranged as an amplifier in a conventional manner. The anode is connected through a resistance 18 to the positive terminal 19 for the high tension source (not shown). The cathode is connected to the earthed negative terminal 20 of this source through a conventional bias network 21. The control grid is connected to earth through the high resistance 22. The output pulses are supplied from the anode to terminal 23 through a blocking condenser 24, and thence to the line or other communication medium over which the pulses are to be transmitted. It will be noted that all the pulse generators are connected to a common ground conductor 25.

The pulses produced at the outputs of the master pulse generator 8 and of the channel pulse generators 10 should in all cases be negative pulses, and the pulses produced by the channel pulse generators should preferably be of smaller amplitude than the coded pulses produced by the master pulse generator. The pulses obtained at the output terminal 23 will accordingly be positive pulses, and the valve 13 should therefore preferably be biassed so that normally a moderate anode current is produced, and should operate so that the distinction in amplitude between the coded pulses and the channel pulses is maintained.

While, for simplicity, the valve 13 has been shown as a triode, it will, of course, be understood that a pentode may be used, with the additional electrodes connected and polarised in the usual way.

Figure 4:
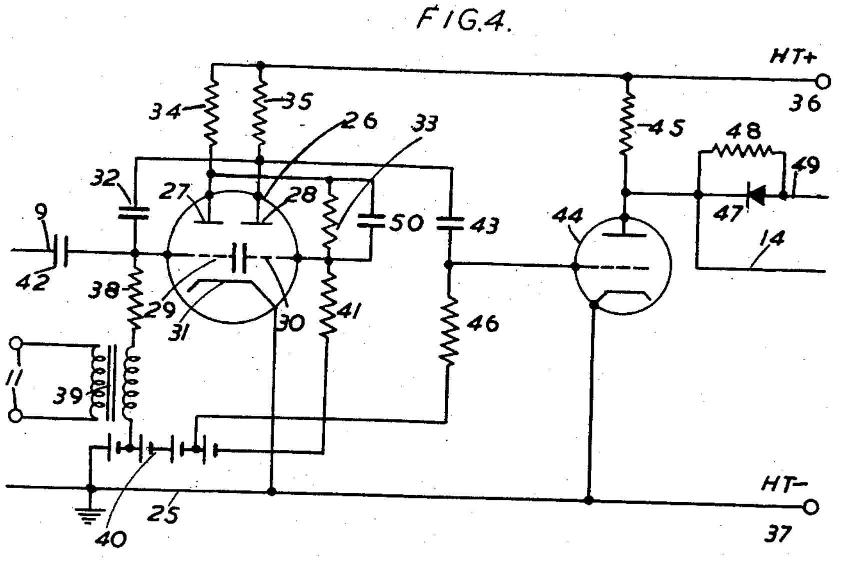

Fig. 4 shows the details of one of the channel pulse generators 10, all of which are exactly alike, as already stated. The circuit comprises a double triode valve 26 (which can obviously be replaced by two separate triodes) arranged as a two-condition relaxation oscillator circuit of well known type in which the first or normal condition is permanently stable and the second condition is only temporarily stable. The two anodes of the double triode are designated 27 and 28, the two corresponding control grids are designated 29 and 30, and the common cathode is designated 31. The anode 28 is connected to the grid 29 through a condenser 32, and the anode 27 is connected through resistance condensers 50 and 33 to the control grid 30. The anodes 27 and 28 are respectively connected through resistances 34 and 35 to the positive terminal 36 for the high tension source (not shown), and the cathode 31 is connected to the common ground conductor 25 to which the negative terminal 37 of the high tension source is also connected. The control grid 29 is connected through a resistance 38 and the secondary winding of the transformer 39 to a suitable point on a negative biassing source 40. The control grid 30 is connected through a resistance 41 also to a suitable point in the source 40.

The input conductor 9 is connected through a blocking condenser 42 to the control grid 29, and the primary winding of the transformer 39 is connected to the input terminals 11 to which the signal voltages are applied.

The two control grids 29 and 30 are so biassed that in the first or permanently stable condition of the relaxation oscillator, the left-hand anode 27 is drawing current, while no current flows to the right-hand anode 28. In this condition the control grid 29 will have a small negative potential, while the control grid 30 will have a large negative potential. When a negative pulse arrives over conductor 9 from the master pulse generator (or from the preceding channel pulse generator), the left-hand half of the double triode 26 will be cut off and the right-hand half will be rendered conducting, thus switching the relaxation oscillator over to the second or temporarily stable condition. The condenser 32 now discharges through resistances 35 and 38, and after a time depending on the time constant of the elements 32, 35 and 38, the potential of the control grid 29 reaches the cut-off point, and the relaxation oscillator reverts to the first permanently stable condition. However, since the effective bias of the control grid 29 depends on the instantaneous signal voltage generated in the secondary winding of the transformer 39, the time taken by the potential of the grid to reach the cut-off point depends on this signal voltage. In other words, the time during which the relaxation oscillator remains in the second condition is determined by the signal voltage.

At the moment when the oscillator reverts to the first condition, the potential of the anode 28 suddenly rises, and a corresponding positive short pulse is transferred through the blocking condenser 43 to the control grid of the inverting valve 44. This valve is conveniently arranged with the anode connected through a resistance 45 to terminal 36 and the cathode directly connected to the common ground conductor 25. The control grid is connected through a resistance 46 to a suitable point on the biassing source 40. The anode is connected through a rectifier 47 shunted by a resistance 48 to an output conductor 49 which is connected to the corresponding one of the condensers 12 in Fig. 3. The output conductor 14 is connected directly to the anode.

The valve 44 should preferably be biassed just beyond the cut-off, so that it does not respond to the negative short pulse which is produced when the relaxation oscillator is initially switched from the first to the second condition, and which is applied to the control grid through the condenser 43.

From what has been explained it must be clear that the negative output channel pulse is produced in the conductor 49 at a time after the corresponding exciting pulse is applied to conductor 9 (whether from the master pulse generator 8 or from the preceding channel pulse generator) which time depends on the instantaneous signal voltage applied to terminal 11. In this way the desired pulse train according to the invention and illustrated in Fig. 1 will be obtained.

The rectifiers 16 and 47 are provided to prevent the output circuit of the inverting valve 44 which is operating for the time being from being loaded by the other output circuits connected to the mixing valve 13 (Fig. 3). It will be seen that each rectifier is so directed that it will pass a negative pulse from the anode of the corresponding valve 44, but will prevent a negative pulse applied to conductor 49 from one of the other output circuits from flowing through the valve.

Since the potential of the control grid 29 is constantly varying in accordance with the signal, the amplitude of the exciting negative pulse applied to conductor 9 should be made sufficiently large definitely to switch the relaxation oscillator over to the second condition at a time which is independent of the signal voltage. In order to obtain a rapid response to the exciting pulse, the resistance 33 may, if desired, be shunted by a small condenser 50 through which the potential change of the anode 27 is conveyed instantaneously to the control grid 30. This is a well known practice.

If desired, also, the valve 44 may evidently be a pentode instead of a triode with the additional electrodes polarised in any suitable way.

The negative biassing source 40 is shown conventionally as a battery of cells, but this is intended to indicate any convenient biassing arrangement.

The rectifiers 16 and 47 may be diodes, or metal rectifiers of the selenium or germanium or copper oxide type, or may comprise any suitable type of rectifying circuit.

It will be clear that when the last channel pulse generator has operated, all the generators will be in the normal or first condition and will be ready for operation again in response to the next coded pulse. The restoring times of the generators in the absence of any modulating signal voltage should preferably be all equal and should be in accordance with the formula stated above, in order that under any condition of modulation, the last of the generators will have completed its operation before the next coded pulse arrives.

If the signals to be conveyed by the channels are speech signals, the repetition frequency of the coded pulses produced by the master pulse generator 8 should preferably be not less than about 8,000 pulses per second if satisfactory commercial reproduction of the speech is to be obtained.

Figure 5:
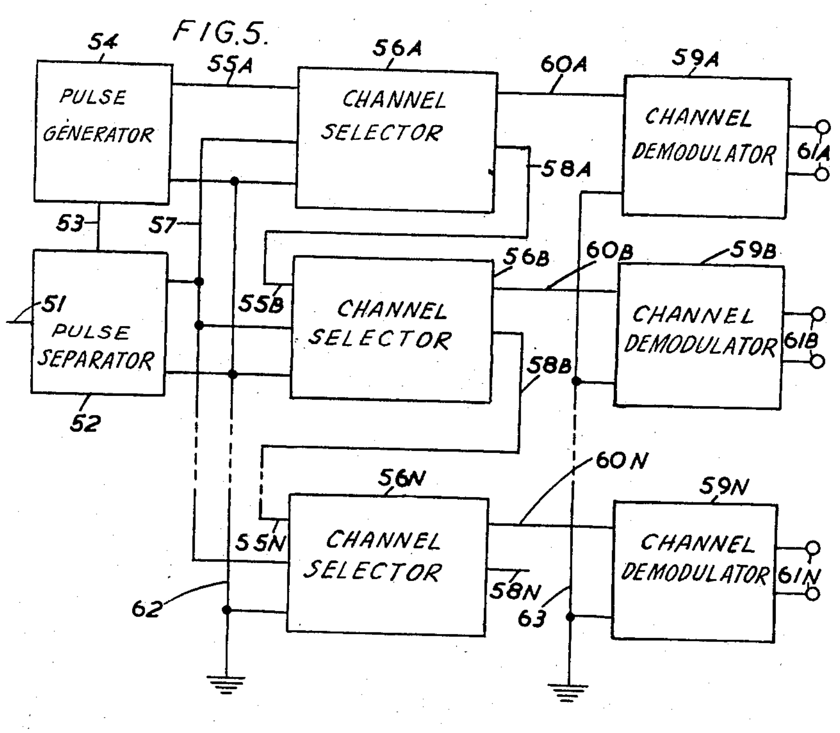
Figs. 5, 6 and 7 show circuit diagrams of a receiving arrangement for such a pulse train.

Fig. 5 shows in block schematic form a receiver for a pulse train of the type shown in Fig. 1. The train of pulses received from the line or other communication medium is applied over conductor 51 to a pulse separator 52 which separates the coded pulses 0 from the channel pulses and applies them over conductor 53 to synchronise a pulse generator 54. This generator should generate short pulses similar to the coded pulses and with the same repetition frequency, and delivers them over conductor 55A to operate the first of a tandem-connected series of *n* channel selectors, of which only the first two and the last are shown and are designated 56A, 56B and 56N. The pulse generator 54 should be designed to deliver a synchronising pulse shortly before the appearance of the first channel pulse in the corresponding signalling period.

The pulse selector 52 also delivers the channel pulses freed from the coded pulses over conductor 57 simultaneously to each of the channel selectors 56. The elements 52 and 54 may be of any suitable known types which it is not necessary to describe in detail.

If desired, the pulse generator 54 could be omitted, and the received coded pulses could be used as the synchronising pulses, being supplied to the channel selector 56A directly over conductors 53 and 55A. The pulse generator could, if necessary, be replaced by a suitable pulse amplifier (not shown).

Figure 6:
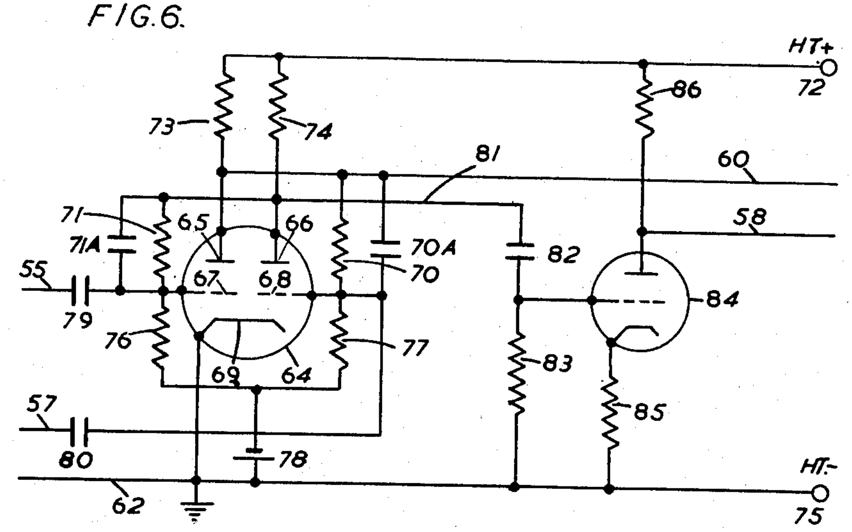

The channel selectors are all identical, and one of them is shown in detail in Fig. 6. Each comprises a two-condition relaxation oscillator circuit generally similar to that shown in Fig. 4, except that it is of the type in which both the conditions are permanently stable. A negative synchronising pulse from conductor 55A (Fig. 5) switches the relaxation oscillator in the channel selector 56A over to the second condition, in which it remains until the first channel pulse 1 (Fig. 1) is received over conductor 57. This switches it back again, and in executing this pair of operations the channel selector generates a positive rectangular pulse whose duration is equal to the modulated time interval between the synchronising pulse and the first channel pulse.

A short negative pulse derived from the trailing edge of the rectangular pulse is applied over conductors 58A and 55B to operate the second channel selector 56B, and this selector then generates in exactly the same way a rectangular pulse whose duration is equal to the modulated time interval between the second channel pulse and the first one, the trailing edge of this rectangular pulse being produced by the second channel pulse 2 (Fig. 1) applied to the channel selector 56B over conductor 57 from the pulse selector 52.

The channel selector 56B then operates the next one in the same way over conductor 58B by a short negative pulse derived from the trailing edge of the rectangular pulse, and thus all the channel selectors are operated in turn, and each generates a positive rectangular pulse whose duration is equal to the time interval between the corresponding channel pulse and the preceding one.

It will thus be apparent that each channel selector will generate a train of positive rectangular pulses which are duration modulated in accordance with the corresponding modulating signal. However, it will also be clear that the rectangular pulses of any channel are also time-phase modulated in accordance with the signals which modulate all of the preceding channels, and so the usual method of demodulating the train of rectangular pulses by passing it through a low pass filter is liable to produce cross talk between the various channels. It is necessary, therefore, to provide a demodulating arrangement in which this crosstalk is avoided or at least rendered negligible.

Figure 7:
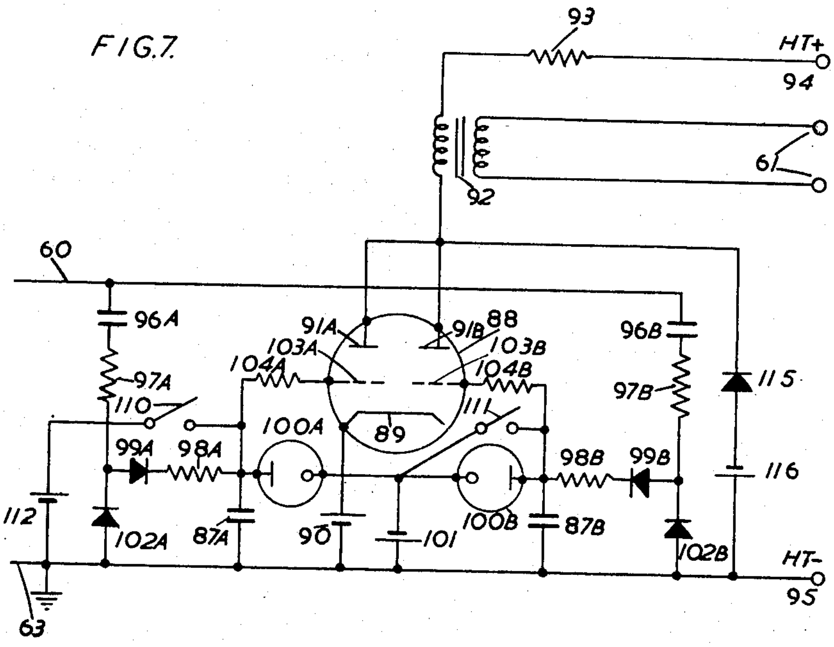

In the circuit of Fig. 5, therefore, each of the channel selectors is provided with a corresponding channel demodulator in which the crosstalk resulting from time-phase modulation is rendered negligible. The first two and the last of these demodulators are shown and are designated 59A, 59B and 59N, respectively. Fig. 7 shows details of one of these demodulators. The rectangular pulses mentioned above are delivered from the channel selectors 56 (Fig. 5) to the corresponding channel demodulators 59 over respective conductors 60A, 60B, etc. and 60N, and the corresponding demodulated signals are obtained from the output terminals 61A, 61B, etc. and 61N.

In Fig. 5, the elements 52, 54 and 56 are all connected to a common ground conductor 62, and the elements 59 to a common ground conductor 63.

The channel selector shown in Fig. 6 comprises a double triode valve 64 having left-hand and right-hand anodes 65 and 66, left-hand and right-hand control grids 67 and 68, and a common cathode 69. The anodes 65 and 66 are respectively connected to the control grids 68 and 67 through resistances 70 and 71 (which may be shunted if desired by small condensers 70A, 71A, to increase the sharpness of response, as before) and to the positive terminal 72 for the high tension source (not shown) through resistances 73 and 74. The negative terminal 75 for the high tension source is connected to ground. The control grids 67 and 68 are respectively connected through resistances 76 and 77 to a common negative biassing source 78 of any convenient type, the positive terminal of which is grounded. The cathode 69 is connected directly to ground. This arrangement forms a well known type of two-condition relaxation oscillator in which both conditions are permanently stable. The input conductors 55 and 57 are respectively connected to the control grids 67 and 68 through blocking condensers 79 and 80. It will be assumed that the relaxation oscillator is initially in the first condition in which the left-hand part of the triode 64 is conducting, and the right-hand part is cut off. If it is also assumed that the channel selector considered is the first one, 56A then as has already been explained, negative synchronising pulses are applied over conductor 55 to the control grid 67 and negative channel pulses over conductor 57 to the control grid 68. As the right-hand portion of the triode is cut off, the channel pulses can have no effect, but when the first synchronising pulse arrives over conductor 55, it cuts off the right hand portion of the triode and switches the oscillator over to the second condition, in which it remains until the first channel pulse 1 (Fig. 1) arrives, and being applied to the control grid 68, switches it back again. None of the following channel pulses can have any further effect on the oscillator, and nothing more happens until the next synchronising pulse arrives, when the process is repeated.

It will be evident that for each operation, a positive rectangular pulse will be generated at the anode 65, and a negative rectangular pulse will be generated at the anode 66, and the duration of these rectangular pulses is equal to the modulated time interval between the first channel pulse 1 and the synchronising pulse. The positive rectangular pulse is delivered to the channel demodulator 59A (Fig. 5) over the conductor 60 which is connected to the anode 65.

At the same time, the negative rectangular pulse is delivered over conductor 81 from the anode 66 to a differentiating circuit consisting of the series condenser 82 and the shunt resistance 83, and the positive differential pulse derived from the trailing edge of this rectangular pulse is applied to unblock an amplifying valve 84 which is biassed (by means of the resistance 85 connecting the cathode to ground) so that it is normally cut off. The anode of this valve is connected to terminal 72 through a resistance 86, and the output conductor 58 is connected to this anode. Thus the valve 84 delivers a short negative pulse to the conductor 58 which substantially coincides with the trailing edge of the rectangular pulse generated by either of the anodes of the triode 64. It will be understood that since the valve 84 is normally cut off, the negative differential pulse, which coincides with the leading edge of the rectangular pulse, will have no effect.

The operation of the other channel selectors beyond the first is the same, except that the negative pulse supplied over conductor 55 comes from the output conductor 58 of the preceding channel selector instead of from the pulse generator 54. It should, however, be pointed out that except in the case of the first channel selector, negative pulses will be simultaneously applied to conductors 55 and 57, the second of which is the channel pulse which corresponds to the preceding channel selector, and the first of which is derived from that channel pulse after operation of the said preceding channel selector. These two negative pulses act on the relaxation oscillator in opposition to one another, and it is therefore necessary to arrange so that the gain of the amplifier valve 84 of the preceding selector is sufficient to apply to conductor 55 of the selector in question a pulse of sufficiently larger amplitude than the pulse delivered to conductor 57, so that this larger pulse may take control and may switch the oscillator to the second condition in spite of the presence of the pulse on conductor 57. It should be noted, also, that when the next channel pulse arrives on conductor 57 to switch the oscillator back again, there will be no pulse on conductor 55 to interfere with it.

In the case of the last channel selector 56N (Fig. 5), the output conductor 58N is not used, so it is evident that in the case of this particular channel selector, the elements 58 and 81 to 86 may all be omitted, if desired.

Fig. 7 shows circuit details of one of the channel demodulators 59 of Fig. 5. It comprises two similar integrating circuits which respectively include the grounded reservoir condensers 87A and 87B and a double triode combining valve 88 the combined anode current of which is substantially proportional to the sum of the charges of the two condensers. The cathode 89 of the valve 88 is connected to ground through a positive biassing source 90 and the two anodes 91A and 91B are connected together and through the primary winding of an output transformer 92 and a resistance 93 to the positive terminal 94 for the high tension source (not shown) the negative terminal 95 of which is grounded. The secondary winding of the transformer 92 is connected to the output terminals 61. As will be explained later, the sum of the reservoir condenser charges is made substantially proportional to the modulating signal voltage, so that this signal will be obtained from the terminals 61.

As will also be made clear later, each of the condensers 87A and 87B is charged during the pulse period immediately preceding one of the channel pulses corresponding to the channel being demodulated, and is rapidly discharged during the same pulse period in the next signalling period. Furthermore, the two condensers 87A and 87B operate alternately, so that when one is being charged, the other is being discharged.

The positive rectangular pulses from the anode 65 of the channel selector (Fig. 6) are applied over conductor 60 through blocking condensers 96A and 96B to charge condensers 87A and 87B through resistances 97A, 98A and 97B, 98B and through the rectifiers 99A and 99B, which are directed so that they will pass positive charging currents to the condensers 87A and 87B, the upper terminals of which are connected to ground through gas filled diodes 100A and 100B and a common negatively biassing source 101, the anodes of the diodes being connected to the condensers. The lower ends of resistances 97A and 97B are connected to ground by rectifiers 102A and 102B having their anodes connected to ground. The junction points of the condensers 87A, 87B and resistances 98A and 98B are respectively connected to the control grids 103A and 103B of the valve 88 through resistances 104A and 104B.

The manner in which the circuit operates will be explained with reference to Fig. 8. In this figure, curve (*a*) represents three of the rectangular voltage pulses delivered to conductor 60, curves (*b*) and (*c*) represent respectively the variations of potential of the condensers 87A and 87B, and curve (*d*) represents the sum of the curves (*a*) and (*b*). In each curve ordinates represent voltages, and the abscissae represent times, and the reference voltage line is marked *r*. The actual voltage corresponding to this line in curves (*b*), (*c*) and (*d*) is substantially that of the source 101.

The pulses 105, 106 and 107 in curve (*a*) have been shown much closer together than they would be in practice in order to save space and to make a clear diagram. They would be spaced apart by the signalling period, which may be of the order of ten or twelve times the duration of each pulse, or more, according to the number of channels in the system. As already explained, the leading edge of the pulse 105 coincides substantially with, say, the *m*th channel pulse, and the trailing edge with the $m+1$th channel pulse in one of the signalling periods, and the leading and trailing edges of the next pulse 106 likewise substantially coincides with the *m* and $m+1$th channel pulses in the next signalling period, and so on.

It will first be assumed, for clearness, that the condenser 96B is temporarily disconnected from conductor 60 (Fig. 7). Curve (*b*) of Fig. 6 shows that during the period of the pulse 105, the condenser 87A charges up, the potential rising in the manner indicated by the portion 108 of the curve. On the disappearance of the pulse 105 the condenser 87A is prevented from discharging by the rectifier 99A, which is now blocked. The potential of the condenser 87A therefore remains substantially constant at a value $v_1$ until the appearance of the next rectangular pulse 106, when it commences to rise again as indicated. However, it presently reaches a value $v_2$ at which the gas-filled diode 100A is fired; this then discharges the condenser 87A very rapidly to the reference level *r*, as shown by the portion 109 of curve (*b*). On the arrival of the next rectangular pulse 107, the condenser 87A begins to charge again and the same series of operations is repeated. Thus the condenser 87A is charged and discharged during alternate pulse periods.

It will be evident that if the condenser 96A is now disconnected from conductor 60 and 96B is connected instead, the condenser 87B will be charged and discharged by alternate rectangular pulses in exactly the same way. With both condensers 96A and 96B connected to conductor 60, both of the condensers 87A and 87B will be charged and discharged by alternate rectangular pulses. It is, however, necessary to ensure that the charging and discharging operations of the condenser 87B will be staggered with respect to the operations of the condenser 87A, as shown in curve (*c*) of Fig. 8. To this end one of these condensers 87A, is provided with a means for giving it an initial charge, and the other, 87B, with short-circuiting means. These means comprise two mechanically connected normally open switches 110 and 111, and a suitable grounded source 112 of positive voltage. This source is connected through the switch 110 to the upper terminal of condenser 87A and should be capable of charging the condenser to a potential a little less than $v_2$ when the switch 110 is closed. The switch 111 is connected in shunt with the diode 100B and is adapted when closed to discharge the condenser 87B. Thus after switching on the circuit, the switches 110 and 111 are momentarily closed, and then open again. This will discharge the condenser 87B and charge the condenser 87A to a potential of $v_1$, so that on the arrival of the first retangular pulse, condenser 87A will discharge first, and 87B will be charged to potential $v_1$, as explained, and then discharged by the next rectangular pulse, so that the desired staggered operation of the two condensers as indicated by curves (*b*) and (*c*) of Fig. 8, is obtained.

Curve (*d*) is the sum of curves (*b*) and (*c*) and represents the variation of the sum of the potentials of the two reservoir condensers. Assuming that the signal modulating voltage is temporarily constant, then all the rectangular pulses will have the same duration, and the potential represented by the curve (*d*) has a constant value equal to $v_1$, except for the local irregularities 113 which occur during the pulse periods.

If now the valve 88 be biassed so that changes in the anode curent in each half are substantially proportional to the corresponding changes of the reservoir condenser potentials which are applied to the control grids, then curve (*d*) also represents the variations of the combined anode current which passes the primary winding of the transformer 92.

It will be apparent that the value of the voltage $v_1$ to which the condenser potential rises during the charging period will be substantially proportional to the duration of the rectangular pulses 105 etc. and will therefore vary in accordance with the modulating signal voltage. Disregarding the irregularities 113 therefore, the modulating signal would be obtained at terminals 61 substantially undistorted. The form of the irregularities 113 however depends somewhat on the instantaneous value of the modulating voltage, and so slight distortion will be introduced. Since, however, as already stated, the rectangular pulses are time-phase modulated in accordance with all of the preceding modulating signals, the irregularities 113 are likewise so modulated and slight crosstalk will be produced. This distortion and crosstalk is found to be negligible, particularly when there are a large number of channels, in which case the percentage of the signalling period occupied by the irregularities becomes small. This effect can be further reduced by cutting off the tops 114 of the irregularities above the level corresponding to the voltage $v_2$, by means of the rectifier 115 (Fig. 7) which connects the anodes 91A and 91B to a grounded negative biassing source 116. The cathode of the rectifier 115 should be connected to the anodes of valve 88, as shown. The voltage of the source 116 should be chosen so that the rectifier will short circuit the valve when the anode voltage of the valve rises above the value corresponding to the voltage $v_2$.

The rectifiers 102A and 102B are provided to prevent negative potentials from being applied to the reservoir condensers.

The charging rate of the condensers should be adjusted by means of the resistances 97A, 98A, and 97B, 98B, so that for rectangular pulses of minimum duration the voltage $v_1$ is slightly more than half $v_2$, so that discharge of the condenser just before the end of the second pulse period is ensured. Preferably also the modulation time variation of the pulse period should not exceed about ± 50% of the average time interval between adjacent pulses.

The embodiments of the invention which have been described so far are concerned with multi-channel pulse communication systems. When there is only one channel, as has already been explained, no synchronising or coded pulses are required, and much simpler arrangements become possible.

Figures 8, 9, 10, 11:
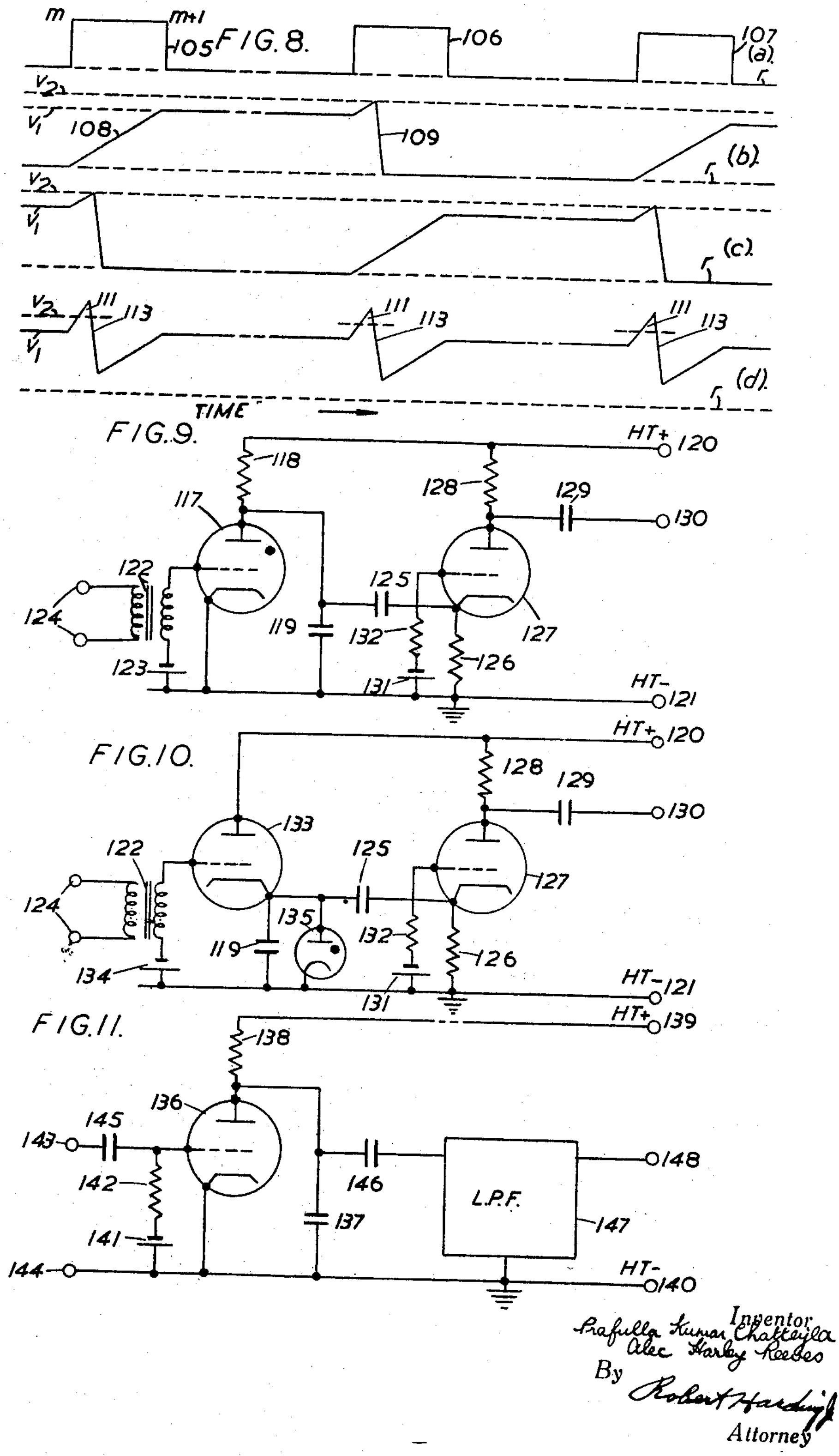
Fig. 8 shows diagrams used in explaining the operation of this receiving arrangement.
Figs. 9 and 10 show circuit diagrams of two slightly different arrangements for generating a single channel pulse train according to the invention.
Fig. 11 shows a circuit diagram of a receiving arrangement for this type of pulse train.

Figs. 9 and 10 show two slightly different arrangements for generating a channel pulse train according to the invention of the kind described with reference to Fig. 2. In Fig. 9, a grid-controlled gas-filled triode 117 is associated with a resistance 118 and a condenser 119 which are connected in series between the terminals 120 and 121 for the high tension source (not shown), the arrangement forming a saw-tooth wave generator of conventional type. The control grid of the valve 117 is connected through the secondary winding of a signal input transformer 122 to a grounded bias source 123 of appropriate potential and sign. The primary winding is connected to the signal input terminals 124.

The anode firing potential depends upon the instantaneous value of the control grid potential, which is determined by the voltage of the signal which is applied to terminals 124. It will be clear that the condenser 119 will be charged steadily through the resistance 118 until its potential reaches a value which depends upon the signal voltage, and is then discharged by the firing of the valve. Thus when a positive signal voltage is applied to the control grid, the condenser 119 will be discharged earlier than when the signal voltage is zero or negative. Hence a train of saw-tooth waves will be generated such that the interval between successive fly-back strokes is substantially proportional to the signal voltage. If therefore, a short pulse is derived from each fly-back stroke, it is evident that such short pulses will form a train having the characteristics of Fig. 2.

Accordingly, the saw-tooth waves are applied to a differentiating network comprising the series condenser 125 and the shunt resistance 126. The resistance 126 is connected in series with the cathode of an amplitude limiting valve 127. The anode of this valve is connected through a resistance 128 to terminal 120 and through a blocking condenser 129 to an output terminal 130.

The control grid of the valve 127 is connected to a grounded negative biasing source 131 through a high resistance 132. This valve should be biased to the cut off point so that positive voltages applied to the cathode will have no effect. The negative differential pulses, which coincide with the fly-back strokes of the saw-tooth waves generated by the valve 117, will however be able to produce an output, and should be of sufficient amplitude to saturate the valve 127. It will be clear, therefore, that a train of negative pulses of constant amplitude will be obtained at the output terminal 130, and the periods between successive pulses will be modulated in accordance with the signal voltage as required. If positive pulses are required, a suitably arranged inverting valve (not shown) may be provided. Alternatively, the valve 127 may be biassed to saturation, and the negative differentiated pulses may be applied to the control grid instead of to the cathode so that positive output pulses will be obtained.

Fig. 10 shows a modification of Fig. 9 in which the resistance 118 is replaced by the anode-cathode path of a hard valve 133, the control grid of which is connected through the secondary winding of the transformer 122 to an appropriate grounded bias source 134. A gas-filled diode tube 135 shunts the condenser 119. In this case, the charging resistance for the condenser 119 is constituted by the internal anode-cathode resistance of the valve 133 which resistance is varied in magnitude by the signal voltage applied to the control grid through the transformer 122. The gas-filled tube 135 discharges the condenser 119 when its potential reaches a fixed value, but the time taken to reach this value depends on the value of the charging resistance, and therefore on the signal voltage. When the signal voltage incre ses, the charging resistance decreases, and so the duration of the generated saw-tooth waves decreases. The periods between the fly-back strokes are thus modulated in accordance with the signal voltage, and these fly-back strokes are differentiated and the differential pulses are limited by the valve 127 exactly as described with reference to Fig. 9.

Thus the output pulse train obtained at terminal 130 will be of the kind described with reference to Fig. 2.

Fig. 11 shows an example of an arrangement for demodulating this type of pulse train. A hard valve 136 is connected across a condenser 137 which is charged through a resistance 138 from the high tension source (not shown) connected to terminals 139 and 140. The valve 136 is biassed to cut-off by means of the grounded negative bias source 141 connected through the high resistance 142 to the control grid. The incoming pulse train is applied to terminals 143 and 144, the pulses being applied in positive sense to the control grid of the valve 136 through the blocking condenser 145. Each of these pulses unblocks the valve and rapidly discharges the condenser 137, so that a train of saw-tooth pulses is produced, the total area of each of which depends on the time interval between the corresponding discharging pulse and the preceding pulses. These saw-tooth pulses can therefore be directly demodulated in the usual way by passing them through a blocking condenser 146 and a low pass filter 147 to the output terminal 148 to which may be connected any desired type of device (not shown) for reproducing the signals. In certain cases the necessary filtering may be incidentally carried out in the reproducing device itself, and then the filter 147 could be omitted.

It will be understood that the bias sources shown in Figs. 9 and 10 and 11 represent any suitable type of bias sources.

What is claimed is:

1. A multi-channel time modulation electric pulse system of communication comprising a generator of coded pulses, a tandem-connected series of channel pulse generators, each channel pulse generator comprising means responsive to an applied pulse for generating a pulse after a given delay period, a mixer output means, means for applying pulses from said coded-pulse generator to said mixer output means, and to a first of said channel pulse generators to trigger it into operation, means for applying signal energy from a first communication channel to said first channel pulse generator to control the length of its said given delay period in accordance with said signal energy, means for deriving a triggering pulse for the next successive generator of said series simultaneously with the generation of said controlled delayed channel pulse, means in each of said successive generators for applying other pulses simultaneously with the generated respective signal pulses to the next successive generator of the series, means for applying signal energy from each of a plurality of different communication channels to respective ones of said successive generators of the series to control individually their respective given delay periods, means for applying the variously delayed pulses of all said communication channels to said mixer output means, whereby there are provided successive groups of pulses each group comprising a coded pulse and variably spaced individual communication channel pulses, and means for transmitting said successive groups of pulses.

2. A system according to claim 1 wherein each pulse generator of said series comprises, a pair of electron discharge devices connected as a two-condition relaxation oscillator having a first normally permanently stable condition and a second temporarily stable condition, means responsive to a triggering pulse to operate said oscillator into its second condition, and means responsive to the applied signal energy to control the duration of the dwell of said oscillator in its said second condition.

References Cited in the file of this patent

UNITED STATES PATENTS

| | | |
|---|---|---|
| 2,199,634 | Koch | May 7, 1940 |
| 2,403,210 | Butement | July 2, 1946 |
| 2,404,306 | Luck | July 16, 1946 |
| 2,416,305 | Greig | Feb. 25, 1947 |
| 2,419,292 | Shepard | Apr. 22, 1947 |
| 2,419,547 | Greig | Apr. 29, 1947 |
| 2,489,302 | Levy | Nov. 29, 1949 |
| 2,497,411 | Krumhansl | Feb. 14, 1950 |